United States Patent
Morimoto et al.

(10) Patent No.: US 6,947,110 B2
(45) Date of Patent: Sep. 20, 2005

(54) LIQUID CRYSTAL DISPLAY DEVICE

(75) Inventors: Hirokazu Morimoto, Saitama-ken (JP); Shoichi Kurauchi, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 62 days.

(21) Appl. No.: 10/639,638

(22) Filed: Aug. 13, 2003

(65) Prior Publication Data

US 2004/0066477 A1 Apr. 8, 2004

(30) Foreign Application Priority Data

Sep. 19, 2002 (JP) ........................................ 2002-273408

(51) Int. Cl.$^7$ ............................................ G02F 1/1335
(52) U.S. Cl. ........................................ 349/114; 349/158
(58) Field of Search ................................ 349/113, 114, 349/158, 122, 65

(56) References Cited

U.S. PATENT DOCUMENTS

| | | | |
|---|---|---|---|
| 3,982,820 A | * 9/1976 | Hattori et al. | ............... 349/132 |
| 4,712,872 A | * 12/1987 | Kanbe et al. | ............... 349/37 |
| 6,465,268 B2 | * 10/2002 | Hirakata et al. | ............... 438/30 |
| 6,570,634 B2 | * 5/2003 | Kim | ............... 349/107 |
| 6,690,446 B1 | * 2/2004 | Okamoto et al. | ............... 349/181 |

\* cited by examiner

*Primary Examiner*—Kenneth Parker
*Assistant Examiner*—David Chung
(74) *Attorney, Agent, or Firm*—Oblon, Spivak, McClelland, Maier & Neustadt, P.C.

(57) ABSTRACT

A semi-transparent type liquid crystal display device includes circuit array substrate AR, counter substrate CT and liquid crystal layer LQ held between circuit array and counter substrates AR and CT. The alignment of liquid crystal layer LQ is also controlled by circuit array and counter substrates AR and CT. Circuit array substrate AR has transparent and reflective electrode films 8 and 9 at pixel regions. Transparent electrode films 8 to allow light from a rear light source to pass are lower in level than the reflective electrode films 9 to reflect ambient incident light. Counter substrate CT is provided with recesses RS corresponding to the transparent electrode films 8 of circuit array substrate AR to make the thickness of liquid crystal layer LQ thicker at transparent electrode films 8 than at reflective electrode films 9.

10 Claims, 1 Drawing Sheet

LIQUID CRYSTAL DISPLAY DEVICE

FIELD OF THE INVENTION

This invention generally relates to a liquid crystal display device and, more particularly, to a liquid crystal display device to display images by using both light from a rear light source and ambient light.

BACKGROUND OF THE INVENTION

Recently, semi-transparent or hybrid type liquid crystal display (LCD) devices with features of small size, light weight and low power consumption have been used for various apparatuses, such as mobile phones and personal digital assistants (PDAs). An ordinary LCD device holds a twisted nematic liquid crystal material between a pair of electrodes but utilization of a homogeneous liquid crystal material has been begun for an LCD device to improve a brightness characteristic.

A semi-transparent type LCD device with a homogeneous mode of operation applied is disclosed in Japanese Published Patent Application (Tokkai Hei) 11-242226, for instance. Such a semi-transparent type LCD device has pixels provided in transparent and reflective regions where cell gaps (i.e., thicknesses of a liquid crystal layer) are different from each other to improve light utilization efficiency. Since liquid crystal molecules are disposed in substantially the same direction in the homogeneous mode of operation so that the LCD device is simple in structure and its optical compensation is easily made by using a retardation film or the like, the LCD device driven in that mode of operation can achieve a display of images with high contrast and wide viewing angles.

As a concrete example, the transparent and reflective regions are defined by optically transparent and reflective members formed on one of the two electrodes provided for the LCD device. The reflective members reflect ambient light incident from the side of another electrode while the transparent members allow light from a rear light source to pass through. In order to make the cell gaps at the transparent and reflective regions different, the transparent portions formed on one of the substrates are lower in height than the reflective portions Desirable light utilization efficiency requires that the cell gap in the transparent region is necessarily about twice as large as that in the reflective region. In the case, however, that a pixel pitch is less than 60 $\mu$m, it causes reverse molecular tilts to reduce an image contrast, residual images (image sticking), etc. Measures to overcome these problems have been conventionally based upon a surface vapor deposition treatment, a laser alignment forming method or the like. These technologies eventually increase production costs of LCD devices.

SUMMARY OF THE INVENTION

An object of the present invention is to provide an LCD device with high resolution and good display quality which does not substantially require to increase production costs.

According to one aspect of the present invention, a liquid crystal display device includes first and second electrode substrates, a liquid crystal layer held between the first and second electrode substrates, molecular alignment of the liquid crystal layer being controlled by the first and second electrode substrates, and a rear light source, wherein the first electrode substrate includes reflective portions to reflect ambient incident light from the second electrode substrate to pixel regions of the liquid crystal layer and transparent portions provided at lower position than the reflective portions to make light incident from the rear light source pass, and the second electrode substrate includes recesses to make the liquid crystal layer thicker in thickness at the transparent portions than at the reflective portions.

A second aspect of the present invention is to provide the LCD device with pixels disposed in pitches of less than 60 $\mu$m.

A third aspect of the present invention is to provide the LCD device with the liquid crystal layer made of a homogeneous type liquid crystal material.

A fourth aspect of the present invention is to provide the LCD device with the liquid crystal layer made of a twisted nematic type liquid crystal material.

A fifth aspect of the present invention is to provide the LCD device with the second electrode substrate including a transparent resin film and the recesses defined in the transparent resin film.

This patent application is based upon and claims the benefit of priority from the Japanese Patent Application No. 2002-273408, filed on Sep. 19, 2002, the entire contents of which are incorporated herein by reference.

BRIEF DESCRIPTION OF THE DRAWING

A more complete appreciation of the present invention and many of the attendant advantages thereof will be readily obtained as the same becomes better understood by reference to the following detailed descriptions when considered in connection with the accompanying drawings, wherein.

DETAILED EXPLANATION OF THE PREFERRED EMBODIMENTS

Figure 1:
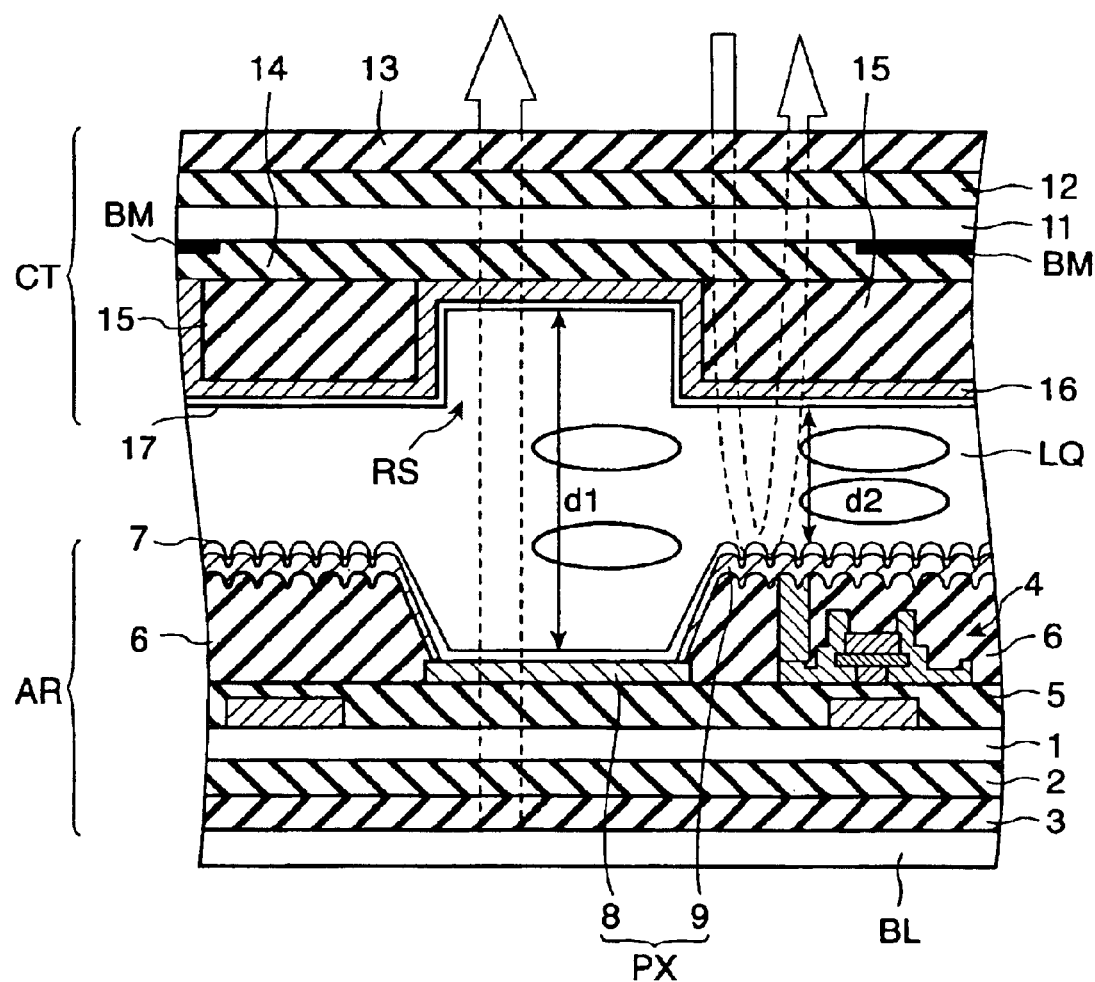
FIG. 1 is a cross-sectional view of a semi-transparent type LCD device of the present invention.

A semi-transparent type LCD device according to an embodiment of the present invention will be explained below with reference to the drawing.

The LCD device with 640×480 color pixels disposed in a matrix form has a 3.5-inch diagonal effective display area and implements the video graphic adaptor (VGA) specification. Each color pixel includes three color-display elements in a line direction. Thus, the total number of display elements is (640×3)×480 while each display element is 55 $\mu$m×165 $\mu$m in size.

FIG. 1 shows a cross-sectional structure of the semi-transparent type LCD device. The LCD device is provided with circuit array substrate AR used for a first electrode substrate, counter substrate CT used for a second electrode substrate, liquid crystal layer LQ held between array and counter substrates AR and CT, and rear light source BL to illuminate array substrate AR from the opposite side with respect to liquid crystal layer LQ. Liquid crystal layer LQ is made of homogeneous liquid crystal materials controlled by electrical potentials applied between array and counter substrates AR and CT. Rear light source BL is an area light source.

Circuit array substrate AR includes 0.7 mm thick glass substrate 1, ¼ wavelength plate 2 to cover the back surface of glass substrate 1, and polarizer 3 attached to the back surface of ¼ wavelength plate 2. Further, thin film transistors 4 are formed on the upper surface side of glass substrate 1 as switching elements. Interlayer insulation film 5 covers the upper surface of glass substrate 1, gate electrodes of thin film transistors 4 and lines connected to the pixels. Transparent resin film 6 covers thin film transistors 4 and uneven portions are formed on the upper surface of transparent resin film 6. Pixel electrodes PX are provided to cover transparent resin film 6 and interlayer insulation film 5. Alignment layer 7 is also provided to cover pixel electrodes PX to control molecular alignments of liquid crystal layer LQ. Pixel electrodes PX have transparent electrode films 8 made of indium-tin-oxide (ITO) and reflective electrode films 9 made of aluminum. Transparent electrode films 8 are formed on interlayer insulation film 5 where apertures are selectively provided to expose transparent resin film 6. Transparent electrode films 8 are optically transparent portions to allow light from rear light source BL on the side of polarizer 3 to pass through. Reflective electrode films 9 are formed on transparent resin films 6 to surround transparent electrode films 8. Reflective electrode films 9 are optically reflective portions to reflect incident light from the side of polarizer 13. Each of the optically reflective portions is a rectangle 55 μm wide by 165 μm long determined in response to a pixel size while that of the optically transparent portions is also a rectangle 15 μm wide by 45 μm long provided in the reflective portion. Reflective electrode films 9 have uneven surfaces corresponding to those of undercoated transparent resin films 6.

As seen in FIG. 1, the substrate AR includes slope portion 6' provided in transparent resin film 6 at opposite sides of transparent electrode film 8.

Counter substrate CT includes 0.7 mm thick glass substrate 11, ¼ wavelength plate 12, polarizer 13, black matrix BM, color filter layer 14, transparent resin films 15, counter electrode 16 and alignment film 17. Glass substrate 11 is covered with ¼ wavelength plate 12. ¼ wavelength plate 12 is covered with polarizer 13. Black matrix BM is formed on the back surface of glass substrate 11 to shield gaps between pixels and surroundings of the pixels from light. Black matrix BM and glass substrate 11 are covered with color filter layer 14. Color filter layer 14 is also covered with transparent resin films 15, which are selectively perforated to define apertures corresponding to the transparent portions of circuit array substrate AR. Transparent resin films 15 facing the reflective portions and their apertures are covered with counter electrode 16. Counter electrode 16 is coated with alignment film 17, which controls molecular orientation of liquid crystal layer LQ. The apertures defined in transparent resin films 15 are covered with counter electrode 16 and alignment film 17 in this order to form recesses RS at counter substrate CT above the transparent portions of circuit array substrate AR. Liquid crystal layer LQ is thicker at recess RS than other portions of counter substrate above the reflective portions of circuit array substrate AR. Color filter layer 14 are colored in red, green and blue in accordance with three different color display elements.

In the LCD device, light from rear light source BL passes through transparent electrode films 8 as penetrating light while incident ambient light is reflected by reflective electrode films 9 as reflecting light. Liquid crystal layer LQ modulates such penetrating and reflecting light with phases in response to voltages applied between pixel electrodes PX and counter electrode 16 to display images.

In FIG. 1, reference symbols "d1" and "d2" represent cell gaps defined at transparent and reflective regions of liquid crystal layer LQ, i.e., thicknesses of liquid crystal layer LQ above the transparent and reflective portions of circuit array substrate AR, respectively. Thicknesses d1 and d2 are properly determined depending on ingredients of liquid crystal layer LQ.

A homogeneous liquid crystal material manufactured by Chisso Corporation, Tokyo, Japan, can be used for the LCD device. This material has the anisotropic reflection index Δn =0.06. An alignment treatment is carried out by applying a rubbing method to provide alignment films 7 and 17 with a pre-tilted angle=7°. Further, where liquid crystal thicknesses at the transparent and reflective portions are d1=5.0 μm and d2=2.5 μm, respectively, good light utilization efficiency is obtained. A fabric woven from 266 denier, 2.5 mm long threads with density of 18/cm is used to rub alignment films 7 and 17 at a rotary speed of 500 r.p.m. for alignment treatment. Under the conditions set forth above, if a difference in level between transparent electrode film 8 and reflective electrode film 9 is 2.5 μm, a thickness of the thread is close to an aperture size at the transparent portion, so that it is difficult to treat alignment film 7 uniformly. To overcome this difficulty, a difference in depth between transparent electrode film 8 and reflective electrode film 9 is set to be 1.25 μm by adjusting a thickness of transparent resin film 6 on circuit array substrate AR. Likewise, the depth of recess RS is also set to be 1.25 μm by adjusting a thickness of transparent resin films 15 on counter substrate CT. In this way, the difference in level between transparent electrode film 8 and reflective electrode film 9 are shared by circuit array and counter substrates AR and CT to maintain liquid crystal layer thickness at the transparent portion, d1=5.0 μm. As a result, even where a thread thickness of the rubbing fabric is close to a pixel pitch, alignment films 7 and 17 are treated to exhibit uniform molecular alignment. The semi-transparent LCD device with the structure of recess RS has been actually manufactured and it has been confirmed that the LCD device has no reverse tilts, residual images or other defects at all.

As set forth above, recesses RS facing the transparent portions are defined on counter substrate CT so that the liquid crystal layer thickness is set to be 5 μm at the transparent portions which is thicker than at the reflective portions. It is possible for recess RS provided on counter substrate to define a part of the thickness. This structure can avoid reverse tilts, residual images or the like due to improper alignment at the alignment films. It is unnecessary to use a vapor deposition surface treatment or a laser alignment layer forming method which increases production costs to define recesses RS but a photolithographic process to transparent resin alignment film 17 can be applied to do so. In short, the embodiment can provide an LCD device with a good display quality which does not require to increase production costs.

The present invention, however, is not limited to the embodiment described above but its modifications and variations are possible without departing from the spirit and the scope of the invention. An acceptable difference in area between convex portions of circuit array substrate AR and transparent resin films 15 on counter substrate CT is within ±20%. Part of color can be eliminated from color filter layer 14 corresponding to the reflective portions. Further, a height difference at uneven portions on the surface of reflective electrode films 9 may be equal to or less than ½ of those on the surface of transparent resin film 6.

Although the embodiment is directed to an LCD device which operates in a homogeneous mode of operation, the present invention is also applicable to other LCD devices which operate in a mode of TN (Twisted N matic), STN (Super Twisted Nematic) or the like.

In the above embodiment, the explanation is given for the structure of recesses RS which are provided on counter substrate CT and face the transparent portions to share a height difference between the transparent and reflective portions so that the thickness of liquid crystal layer LQ is thicker at the transparent portions than at the reflective portions. Since, however, the positioning relationship between the transparent and reflective portions is relative, it is equivalent to the above structure that convex members are provided at counter substrate CT to face the reflective portions make the thickness of liquid crystal thinner than that at the transparent portions.

As explained above, the present invention can provide an LCD device with high resolution and good display quality which does not substantially require to increase production costs.

What is claimed is:

1. A liquid crystal display device, comprising:

first and second electrode substrates;

a liquid crystal layer held between said first and second electrode substrates, molecular alignment of said liquid crystal layer being controlled by said first and second electrode substrates; and a rear light source, wherein said first electrode substrate includes reflective portions to reflect ambient incident light from said second electrode substrate to pixel regions of said liquid crystal layer, transparent portions provided at a lower position than said reflective portions to let incident light from said rear light source pass, slope portions provided between said reflective and transparent portions, and an electrode film covering said slope portions and said reflective and transparent portions, and said second electrode substrate includes recesses to make said liquid crystal layer thicker in thickness at said transparent portions than at said reflective portions.

2. The liquid crystal display device according to claim 1, wherein said pixel region includes pixels which are disposed in pitches of less than 60 μm.

3. The liquid crystal display device according to claim 1, wherein said liquid crystal layer is made of a homogeneous type liquid crystal material.

4. The liquid crystal display device according to claim 1, wherein said liquid crystal layer is made of a twisted nematic type liquid crystal material.

5. The liquid crystal display device according to claim 1, wherein said second electrode substrate includes a transparent resin film, and said recesses are defined in said transparent resin film.

6. A liquid crystal display device according to claim 1, wherein said reflective portions have protrusions.

7. A liquid crystal display device, comprising:

first and second electrode substrates;

a liquid crystal layer held between said first and second electrode substrates, molecular alignment of said liquid crystal layer being controlled by said first and second electrode substrates;

a rear light source; and thin-film transistors to drive said first and second electrodes, wherein said first electrode substrate includes reflective portions to reflect ambient incident light from said second electrode substrate to pixel regions of said liquid crystal layer and transparent portions provided at a lower position than said reflective portions to let incident light from said rear light source pass, said second electrode substrate includes recesses to make said liquid crystal layer thicker in thickness at said transparent portions than at said reflective portions, and said thin-film transistors are formed underneath said reflective portions of said first electrode.

8. A liquid crystal display device according to claim 7, wherein said reflective portions have protrusions.

9. A liquid crystal display device, comprising:

first and second electrode substrates;

a liquid crystal layer held between said first and second electrode substrates, molecular alignment of said liquid crystal layer being controlled by said first and second electrode substrates;

a rear light source; and thin-film transistors to drive said first and second electrode substrates, wherein said first electrode substrate includes reflective portions to reflect ambient incident light from said second electrode substrate to pixel regions of said liquid crystal layer, transparent portions provided at a lower position than said reflective portions to let incident light from said rear light source pass, slope portions provided between said reflective and transparent portions, and an electrode film covering said slope portions and said reflective and transparent portions, said second electrode substrate includes recesses to make said liquid crystal layer thicker in thickness at said transparent portions than at said reflective portions, and said thin-film transistors are formed underneath said reflective portions of said first electrode.

10. A liquid crystal display device according to claim 9, wherein said reflective portions have protrusions.

* * * * *